US008695061B2

(12) United States Patent
Kubo

(10) Patent No.: US 8,695,061 B2
(45) Date of Patent: Apr. 8, 2014

(54) DOCUMENT PROCESS SYSTEM, IMAGE FORMATION DEVICE, DOCUMENT PROCESS METHOD AND RECORDING MEDIUM STORING PROGRAM

(75) Inventor: Shusaku Kubo, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1203 days.

(21) Appl. No.: 12/104,083

(22) Filed: Apr. 16, 2008

(65) Prior Publication Data

US 2009/0037980 A1 Feb. 5, 2009

(30) Foreign Application Priority Data

Jul. 24, 2007 (JP) .................................. 2007-192061

(51) Int. Cl.
*G06F 21/00* (2013.01)
(52) U.S. Cl.
USPC ........ 726/2; 726/4; 726/17; 726/21; 713/166; 713/167; 713/168
(58) Field of Classification Search
USPC .......................... 726/4, 17, 21; 713/166–167
See application file for complete search history.

(56) References Cited

U.S. PATENT DOCUMENTS

| 5,991,709 | A * | 11/1999 | Schoen .............................. 704/1 |
| 2001/0043740 | A1 * | 11/2001 | Ichikawa et al. ............... 382/176 |
| 2004/0128555 | A1 * | 7/2004 | Saitoh et al. ................... 713/201 |
| 2005/0171914 | A1 * | 8/2005 | Saitoh ............................. 705/51 |
| 2005/0234859 | A1 * | 10/2005 | Ebata .............................. 707/1 |
| 2006/0070120 | A1 * | 3/2006 | Aoki et al. ........................ 726/4 |
| 2006/0126095 | A1 * | 6/2006 | Tamura et al. ................ 358/1.14 |
| 2006/0206462 | A1 * | 9/2006 | Barber .............................. 707/3 |
| 2006/0209326 | A1 * | 9/2006 | Higashiura .................... 358/1.9 |
| 2007/0101420 | A1 * | 5/2007 | Masui ............................. 726/10 |
| 2007/0106902 | A1 * | 5/2007 | Miyata .......................... 713/176 |

FOREIGN PATENT DOCUMENTS

| JP | A-10-003429 | 1/1998 |
| JP | A-2001-266112 | 9/2001 |
| JP | A-2002-269093 | 9/2002 |
| JP | A 2003-114884 | 4/2003 |
| JP | A 2005-151337 | 6/2005 |
| JP | A-2005-246705 | 9/2005 |
| JP | A-2007-076130 | 3/2007 |

OTHER PUBLICATIONS

Jan. 10, 2012 Japanese Office Action issued in Japanese Patent Application No. 2007-192061 (with translation).

* cited by examiner

*Primary Examiner* — Peter Shaw
*Assistant Examiner* — Ali Shayanfar
(74) *Attorney, Agent, or Firm* — Oliff PLC

(57) ABSTRACT

A document process system, which includes: an authentication section that authenticates an operator of an operation target document; an extraction section that extracts specific information for setting operation restriction information of the document; a setting section that sets the operation restriction information of the document based on authentication information of the operator authenticated by the authentication section and the specific information extracted by the extraction section; and a generation section that generates a protected document to which the operation restriction information is set by the setting section based on the operation target document.

4 Claims, 17 Drawing Sheets

| EXTRACT INFORMATION (CHARACTER) | DETERMINATION LEVEL | DETERMINATION INFORMATION |
| --- | --- | --- |
| CONFIDENTIAL | 3 | CONFIDENTIAL |
| CONFIDENTIAL | 3 | CONFIDENTIAL |
| CUSTOMER LIST | 3 | CONFIDENTIAL |
| TOP SECRET | 3 | CONFIDENTIAL |
| SPECIFICATIONS | 2 | INTERNAL USE ONLY |
| PROPOSAL | 2 | INTERNAL USE ONLY |
| INSTRUCTION MANUAL | 2 | INTERNAL USE ONLY |
| SECRET | 3 | CONFIDENTIAL |

FIG.7A

| EXTRACT INFORMATION (IMAGE) | DETERMINATION LEVEL | DETERMINATION INFORMATION |
| --- | --- | --- |
| IMPORTANT | 3 | CONFIDENTIAL |
| SECRET | 3 | CONFIDENTIAL |
| COPY-PROHIBITED | 3 | CONFIDENTIAL |
| (checkered pattern) | 2 | INTERNAL USE ONLY |
| (maze pattern) | 2 | INTERNAL USE ONLY |
| (maze pattern with mark) | 3 | CONFIDENTIAL |

FIG.7B

| SECTION | POSITION | DETERMINATION INFORMATION | POLICY LEVEL | |
| --- | --- | --- | --- | --- |
| | | | NOT INCLUDING TIME INFORMATION, OR ON/BEFORE TIME INFORMATION | AFTER TIME INFORMATION |
| DEVELOPMENT DEPARTMENT | MANAGER | CONFIDENTIAL | G3 | G2 |
| SALES | GENERAL | CONFIDENTIAL | G2 | G1 |
| DEVELOPMENT DEPARTMENT | MANAGER | CONFIDENTIAL | G2 | G1 |
| DEVELOPMENT DEPARTMENT | MANAGER | INTERNAL USE ONLY | G3 | G2 |
| DEVELOPMENT DEPARTMENT | GENERAL | INTERNAL USE ONLY | G2 | G1 |

| DOCUMENT ID | DOCUMENT NAME | POLICY | RANGE OF DISCLOSURE | PERIOD OF DISCLOSURE | STORAGE LOCATION |
|---|---|---|---|---|---|
| 0234567 | CUSTOMER INFORMATION | G1 | Xth SALES DEPARTMENT | 2008/03/31 | https://abc.co.jp/129 |
| 1234245 | ACCOUNTING INFORMATION | G2 | ACCOUNTING DEPARTMENT | 2010/03/31 | https://abc.co.jp/127 |
| 3222313 | DEVELOPMENT INFORMATION | G3 | PRODUCT DEVELOPMENT DEPARTMENT | 2012/03/31 | https://abc-xyz.co.jp/234 |
| 6429867 | ADVERTISEMENT INFORMATION | G4 | ALL | — | https://abc-xyz.co.jp/121 |

1701  1702  1703  1704  1705  1706

DOCUMENT PROCESS SYSTEM, IMAGE FORMATION DEVICE, DOCUMENT PROCESS METHOD AND RECORDING MEDIUM STORING PROGRAM

CROSS-REFERENCE TO RELATED APPLICATION

This application is based on and claims priority under 35 USC 119 from Japanese Patent Application No. 2007-192061 filed on Jul. 24, 2007.

BACKGROUND

1. Technical Field

The present invention relates to a document process system, an image formation device, a document process method and a recording medium storing a program.

2. Related Art

As one example of techniques for strengthening the security of documents, files and so on, there has been a method for setting a security policy for restricting operations of each document and file. To view or update a document for which the security policy is set, it is required to meet the condition provided by the security policy. For example, by matching identification information set for the document with identification information specified by the security policy, viewing and updating become possible.

SUMMARY

An aspect of the present invention provides a document process system, which includes: an authentication section that authenticates an operator of an operation target document; an extraction section that extracts specific information for setting operation restriction information of the document; a setting section that sets the operation restriction information of the document based on authentication information of the operator authenticated by the authentication section and the specific information extracted by the extraction section; and a generation section that generates a protected document to which the operation restriction information is set by the setting section based on the operation target document.

BRIEF DESCRIPTION OF THE DRAWINGS

Exemplary embodiments of the present invention will be described in detail based on the following figures, wherein:

FIGS. 7A and 7B are diagrams showing a determination level and determination information for the extract information that is a condition used for selecting the policy information;

FIG. 8 is a table configuration diagram showing information representing conditions for selecting the policy information set for the document in the document process system of the exemplary embodiment of the present invention;

FIG. 17 is a diagram showing one state of policy information set to each document in the document process system of the exemplary embodiment of the present invention.

DETAILED DESCRIPTION

Hereinbelow, examples of a document process system, an image formation device and a recording medium storing a program of exemplary embodiments of the present invention will be described in detail with reference to the attached drawings.

First Example

Figure 1:
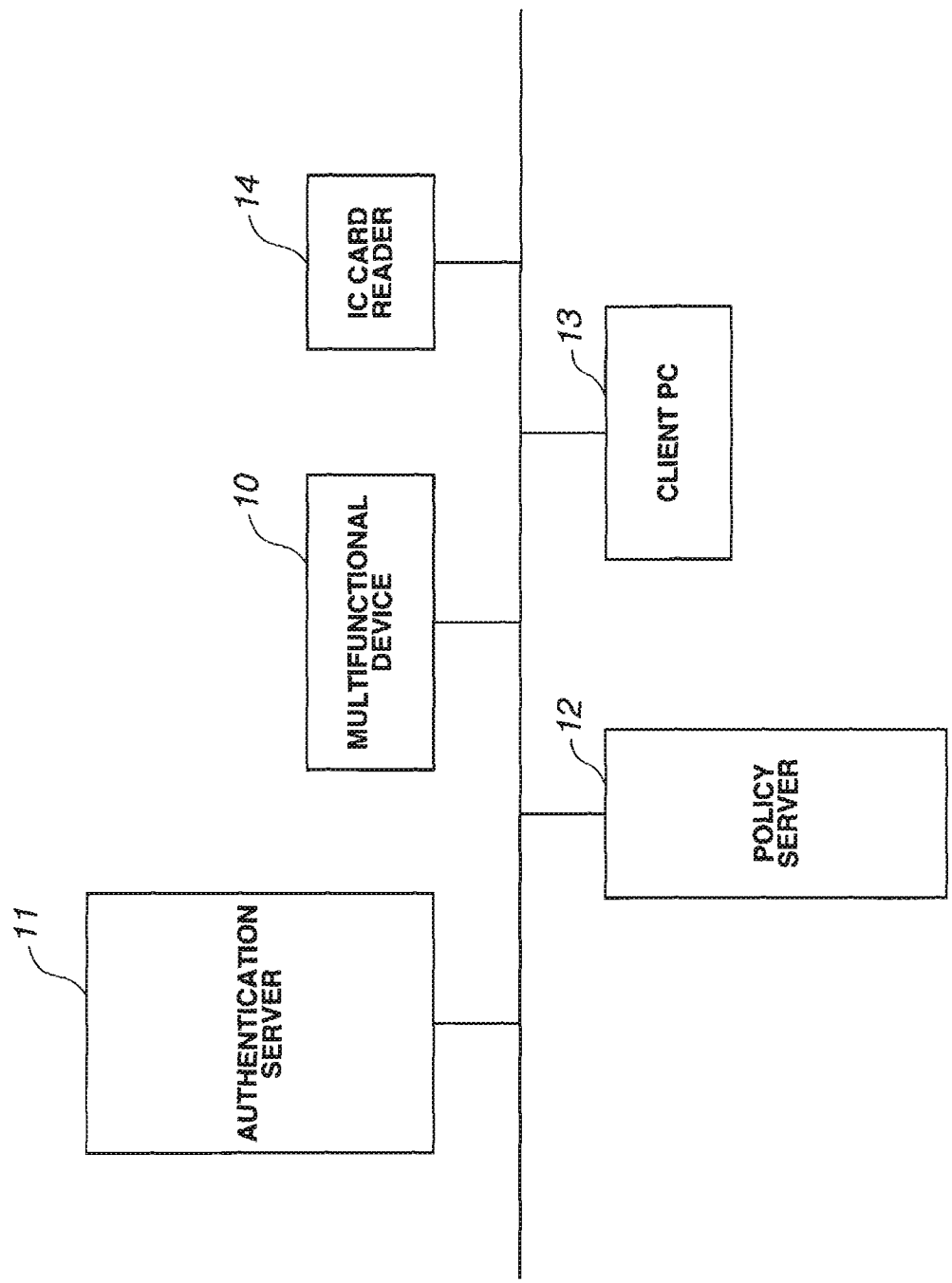
FIG. 1 is an example system configuration diagram showing a document process system formed by applying a document process system, an image formation device and a recording medium storing a program of the exemplary embodiment of the present invention.

FIG. 1 is an example of a system configuration diagram of the document process system formed by applying the document process system, the image formation device, the document process method and the recording medium storing the program of the exemplary embodiment of the present invention.

In FIG. 1, the document process system includes a multi-functional device 10, an authentication server 11, a policy server 12, a client PC 13 and an IC card reader 14, each of which is in a state where intercommunication is available.

The document process system of the present invention is a system in which a securely protected document (hereinafter, "protected document") is generated by designating the best suitable policy information based on a security policy stipulated in the system, and setting (associating) the designated policy information to the document.

The security policy stated above means a policy or standard for securing confidentiality of the document by removing risk factors to the document, and is set for the document process system. By setting (associating) to the document the policy information representing confidentiality level of the security policy set for the document process system, information leakage or unauthorized access is prevented from occurring.

For example, there exist encryption, operator authentication and so on as the security policy for preventing the information leakage or unauthorized access from occurring. Operation restriction can be placed on the document by setting the policy information specifying an encryption level or authentication level to the document. From the viewpoint as described above, the policy information may be also referred to as "operation restriction information."

By reading a printed matter, the multifunctional device 10 is able to generate an electronic document (hereinafter, simply "document") corresponding to the printed matter. Additionally, by analyzing the generated electronic document, the multifunctional device 10 is able to extract predetermined specific image information or character information, which forms the document. The extracted image information, character information. etc. is information for securing the confidentiality of the document or for indicating the confidentiality level, and is used for determining the confidentiality of the document. Hereinafter, this information, is referred to as "extract information." Especially, the image information is referred to as extracted image information, and the character information is referred to as extracted character information.

As some examples of the extract information, there are "confidential," "top secret" and other extracted character information shown in item 701 [extract information (character)] in FIG. 7A; and an secret image, a two dimensional barcode image and other extracted image information shown in item 701 [extract information (image)] in FIG. 7B (FIGS. 7A and 7B will be described later).

Incidentally, in the multifunctional device 10, to extract the extract information from the printed matter, the extract information is registered in advance to the policy server 12, and the registered extract information is compared (pattern matched) with the image information of the document obtained by reading the printed matter.

Then, the multifunctional device 10 sets (associates) the policy information corresponding to the best suitable security policy for the extracted extract information to ensure the confidentiality of the document. The policy information set to the document by the multifunctional device 10 is managed by the policy server 12. The policy server 12 determines the best suitable policy information for the extract information extracted by the multifunctional device 10, and the policy information that is designated as the best suitable policy information is set to the document, whereby the protected document is generated.

Figure 9:
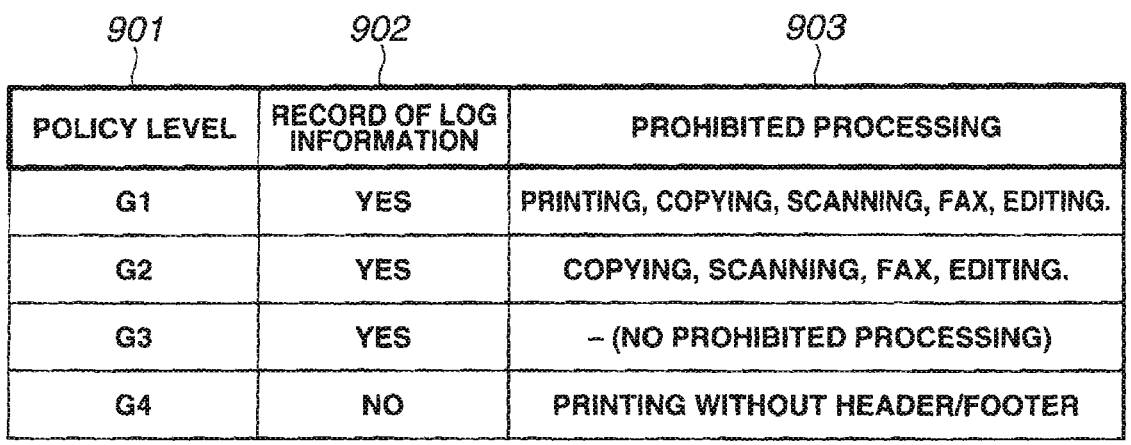
FIG. 9 is a diagram showing a list of prohibited processes designated as the policy information, and information on whether or not log information is recorded.

The policy server 12 manages the policy information to be set to the document, and selects to designate the best suitable policy information based on the extract information obtained from the document. This policy information is managed, for example, with a configuration as shown in FIG. 9. And, the policy information as shown in FIG. 9 is set to the document in accordance with the content indicated by the extracted information.

To enable the policy server 12 to select the best suitable policy information, the policy server 12 receives document information representing content of the document corresponding to the extract information obtained with the multifunctional device 10, as well as authentication information that is read with the IC card reader 14 and in which an authentication server 11 performs authentication of an operator. Then, the policy server 12 determines the best suitable policy information using the document information and the authentication information The IC (card reader 14 reads operator information including information for identifying an operator through operator's IC card to perform authentication of the operator who operates reading the printed matter using the multifunctional device 10.

The authentication server 11 performs authentication of the operator information read through the IC reader 14, whereby the policy server 12 selects and designates the best suitable policy information for the extract information.

The authentication server 11 manages the authentication information on operators. When operation permission for the document is given to an operator whose information is read with the IC card reader 14, the authentication server 11 sends the authentication information on the authenticated operator to the multifunctional device 10.

Needless to say, it may be possible to employ a configuration in which the multifunctional device 10 manages the authentication information on the operator, and has a function of giving permission for information of the operator read with the IC card reader 14 to operate the document. In this case, the authentication server is not necessary.

Upon generating the protected document by setting the policy information, the multifunctional device 10 sends the protected document to the client PC 13, enabling the client PC 13 to perform the operation in accordance with the set policy information. To operate the document using the client PC 13, the authority to operate in accordance with the policy information set to the document is referred to the policy server 12. Then, only the operation other than replied prohibited operations can be performed.

Needless to say, it may be possible to employ a configuration in which, by providing a document management device (not shown), the policy information is not managed by the policy server 12 but by the document management device, and the authority to operate is referred to the document management device at the time when the protected document is operated using the client PC 13.

Figure 2:
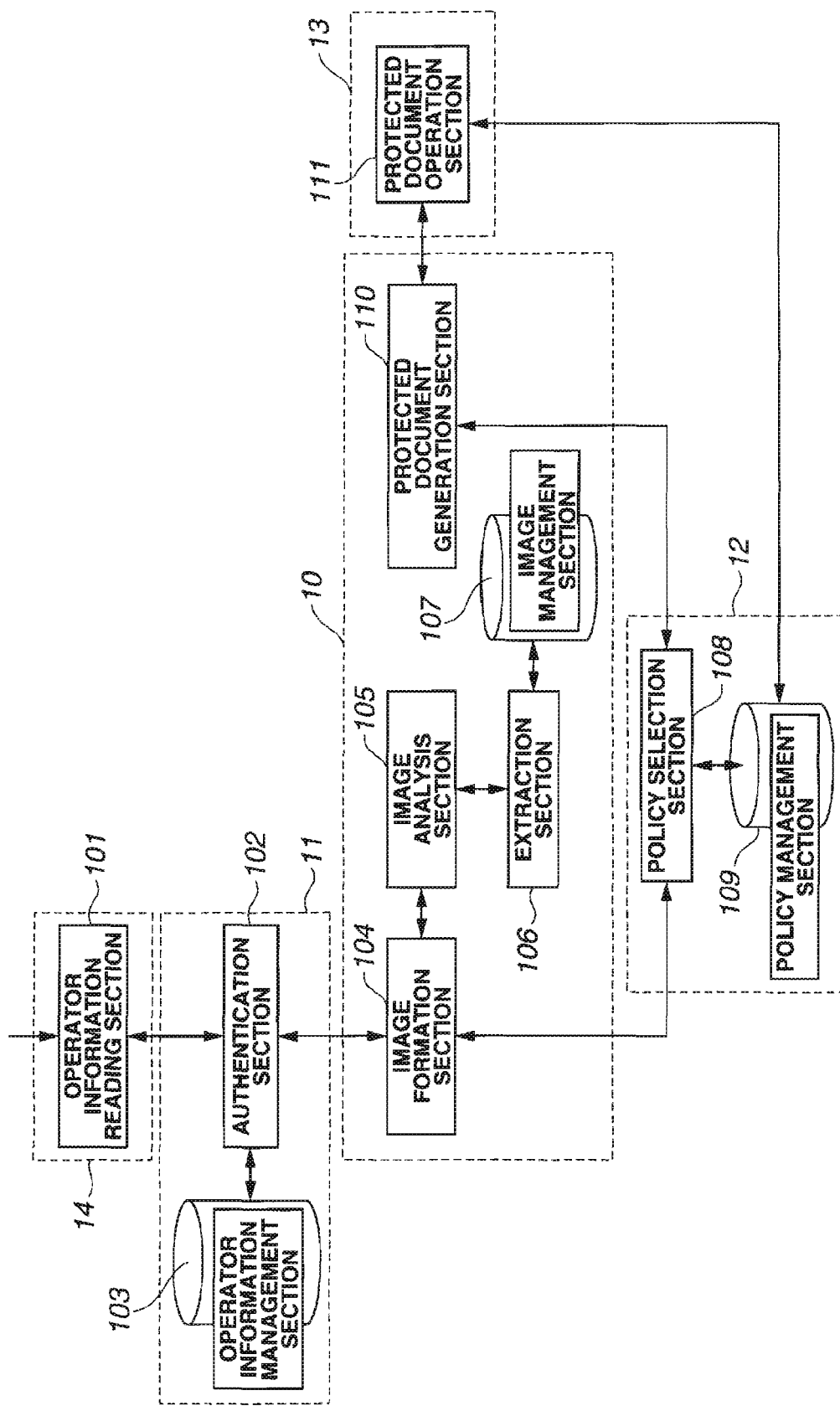
FIG. 2 is a block diagram showing a functional configuration in the document process system of the exemplary embodiment of the present invention.

FIG. 2 is a block diagram showing a functional configuration in the document process system of the exemplary embodiment of the present invention.

The document process system shown in FIG. 2 includes an operator information reading section 101, an authentication section 102, an operator information management section 103, an image formation section 104, an image analysis section 105, an extraction section 106, an image management section 107, a policy selection section 108, a policy management section 109, a protected document generation section 110 and a protected document operation section 111.

As an example, the operator information reading section 110 is realized by the IC card reader 14 shown in FIG. 1; the authentication section 102 and the operator information management section 103 are realized by the authentication server 11 shown in FIG. 1; the image formation section 104, the image analysis section 105, the extraction section 106, the image management section 107 and the protected document generation section 110 are realized by the multifunctional device 10; the policy selection section 108 and the policy management section 109 are realized by the policy server 12; and the protection document operation section 111 is realized by the client PC 13.

The operator reading section 101 reads operator information including information for identifying an operator from the operator's storing medium (e.g. IC (Integrated Circuit) card). The read operator information includes operator identification information, a section to which the operator belongs, operator's position and so on. The authentication section 102 authenticates the operator based on the operator information. The authentication section 102 authenticates the operator based on the operator information read by the operator reading section 101. The operator information management section 103 manages the operator information used for authenticating the operator by the authentication section 102. The authentication section 102 performs the authentication processing based on the information managed by the operator information management section 113.

In the description above, the operator information read by the operator reading section 101 includes such information as the section to which the operator belongs and operator's position, in addition to the operator identification information. However, it may be possible to employ a configuration in which the operator information includes only the operator identification information, and information on the operator identification information is obtained from the operator information management section 103 at the time of authentication of the operator by the authentication section 102.

Upon authenticating the operator by the authentication section 102, the image formation section 104 reads the printed matters and forms an image of the read document. Once the image formation section 104 forms the image information of the document, the image analysis section 105 is requested to analyze the image information. The image analysis section 105 analyzes various images and characters that form the image information, and requests the extraction section 106 to extract the extract information.

The image analysis section 105 performs the analysis processing based on the preset analysis setting information. For example, when a printed matter including plural pages or plural items is read and a request to analyze those pieces of image information is made, a setting for analyzing only the top page, the last page or other specific page is made to the analysis setting information. In this case, the set specific page (the top page, the last page and so on) is analyzed.

Then, after receiving the extraction request from the image analysis section 105, the extraction section 106 extracts extract information, which is matched information as a result of pattern matching of the requested image information with extract information based on which policy level is determined and managed by the image management section 107. Needless to say, the extraction is not limited to the pattern matching processing, and it may be possible to employ a configuration in which image information located in a predetermined position of the document is read, and the read image information is matched against information managed by the image management section 107.

Additionally, the information managed by the image management section 107 is information based on which the policy level of policy information to be set to the document is determined.

After the extraction section 106 extracts the extract information, the extract information is sent to the image formation section 104 through the image analysis section 105. At this time, the image formation section 104 notifies the policy selection section 108 that the extract information is extracted and sends the extract information to the policy selection section 108.

Based on the extracted image received from the image formation section 104, the policy selection section 108 selects the best suitable policy level of policy information set to the document. By selecting the policy level, policy information corresponding to the policy level is set to the document.

The policy management section 109 manages a table as shown in FIGS. 7A, 7B, 8 and 9, and manages conditions for selecting the best suitable policy information set to the document and information on operation restriction caused by the set policy information.

FIGS. 7A and 713 show extract information, which is a condition used for selecting the policy information. FIG. 7A shows determination information corresponding to the extract information on "character," and FIG. 7B shows determination information corresponding to the extract information on "image."

Each FIGS. 7A and 7B is formed with item 701 "Extract information," item 702 "Determination level" and item 703 "Determination information." The item 701 "Extract information" represents extract information that is set in advance; the item 703 "Determination information" represents determination information for determining a security state of the document from which the extracted information is extracted. Additionally, the item 702 "Determination level" represents information indicating a confidential level of the document by quantifying the determination information represented by the item 703 "Determination information." The item 702 "Determination level" and the item 703 "Determination information" correlate each other.

The determination information in the item 703 "Determination information" is used for determining the policy level in the policy information set to the document including the extract information corresponding to the determination information. The item 702 "Determination level" is information used for determining the extract information having higher security when plural pieces of extract information are extracted from the document.

As an example of FIG. 7A, "confidential" is assumed in the extract information in the item 701 "Extract information"; "3" is assumed in the determination level in the item 702 "Determination level"; and "Confidential" is assumed in the determination information in the item 703 "Determination information." This example means that the determination information "Confidential" is set to the extract information "confidential" extracted from the document, and the determination level of the determination information "Confidential" is set to "3."

As another example, "specifications" is shown in the extract information in the item 701 "Extract information"; "2" is shown in the item 702 "Determination level"; and "Internal Use Only" is shown in the item 703 "Determination information." This example means that the determination information "Internal Use Only" is set to the obtained extract information "specifications," and the determination level of the determination information "Internal Use Only" is set to "2."

In other words, when those two pieces of extract information ("confidential", "specifications") are extracted from the document, the determination information corresponding to the highest determination level is established by comparing each of the determination levels of those pieces of the extract information, and is set as a condition used for selecting the policy information.

Incidentally, in the examples above, the determination levels set for the obtained extract information "confidential" and "specifications" are "3" and "2", respectively. Thus, it is determined that the determination level "3" is the highest determination level, and the determination information "Confidential" corresponding to the determination level "3" is established to the condition used for selecting the policy information.

In FIG. 7B, the determination information corresponding to the image of the obtained extract information is also identified, as is the case with FIG. 7A. When an image having plural pieces of extract information is extracted, the determination information corresponding to the extract information having the highest determination level is established by comparing the determination levels set to the respective images, and is set as a condition used for selecting the policy information.

Additionally, as example images of the extract information in the item 701 "Extract information" in FIG. 7B, an important mark image, a secret mark image, a copy-prohibited mark image, a two-dimensional barcode image, a glyph code image and modified glyph code image are shown. Needless to say, those images are only examples images. Thus, images of the extract information are not limited to the images above, and the determination information may be set to other various images.

Next, FIG. 8 is a table configuration diagram showing information, which is a condition for selecting the policy information set to the document.

In FIG. 8, item 801 "Section" and item 802 "Position" represent "section to which the operator belongs" and "position," respectively, each of which is operator's attribute included in the authentication information. Additionally, item 803 "Determination information" represents determination information specified from the extract information.

The policy level of the policy information set to the document and corresponding to the information above is indicated in item 804 "Policy level." The policy level indicated in the item 804 "Policy level" is defined by whether the date of operation is on or before a pre-designated time information, or after the time information. Note that, in a case where the time information is not included, the policy level is handled similar to the case with on or before the time information.

This time information is information indicating time for a break for changing the policy information applied to the document. The policy information is changed before and after the time indicated by the time information elapses.

For example, in a case where the extract information obtained from the document is "confidential"; the section to which the operator belongs and the position included in the authentication information are "Development Department" and "Manager", respectively; and the obtained extract information is "Specifications", the determination information is determined to be "Internal Use Only" in light of FIGS. 7A and 7B.

Additionally, in a case where the time information is not set to the document or the date of process when the document is operated is on or before the time information, policy level "G3" is applied. In a case where the date of process is after the time information, policy level "G2" is applied.

FIG. 9 shows specific prohibited processes of each of the policy levels, which is the policy information determined as described above.

FIG. 9 is formed with item 901 "Policy level," item 902 "Record of log information" and item 903 "Prohibited processing."

The item 901 "Policy level" is a policy level indicating policy information set to the document; the item 902 "Record of log information" is an item for determining whether or not log information is recorded in order to be traceable; and the item 903 "Prohibited processing" is a list of prohibited processes (operations).

In a case of a document to which the policy level of "G1" is set, the item 903 "Prohibited processing" indicates "printing, copying, scanning, FLAX, editing." Thus, these processes are prohibited. Additionally, the item 902 "Record of log information" indicates "Yes." Thus, the log information is recorded.

Additionally, in a case of a document to which "G2" is set, the item 903 "Prohibited processing" indicates "copying, scanning, FAX, editing." Thus, these processes are prohibited. The item 902 "Record of log information" indicates "Yes." Thus, the log information is recorded. Additionally, in a case of a document to which "G3" is set, the item 903 "Prohibited processing" includes no prohibited process. Thus, all the processes are allowed. Additionally, the item 902 "Record of log information" indicates "Yes." Thus, the log information is recorded.

Additionally, in a case of a document to which "G4" is set, the item 903 "Prohibited processing" indicates "printing without header/footer." Thus, this process is prohibited. Additionally, the item 902 "Record of log information" indicates "No." Thus, there is no need to record the log information.

As a method for making the document traceable through recording the log information, for example, there is a method of incorporating a barcode, a two-dimensional barcode or other digital information into the document.

As described above, the policy management section 109 manages various tables. Once the policy selection section 108 selects the policy level corresponding to the policy information to be set to the document, the protected document generation section 110 generates the protected document to which the policy information indicated by the policy level is set.

The protected document generated by the protected document generation section 110 is a document in which, after a policy level is set, operation restriction, which is set to the policy level for prohibiting an operation, is set.

When the generated protected document, which is operable by the protected document operation section 111, is operated by the protected document operation section 111, authority for operation corresponding to the policy information managed by the policy management section 109 and set to the protected document is checked, and operations other than the restricted operations can be performed.

Figure 3:
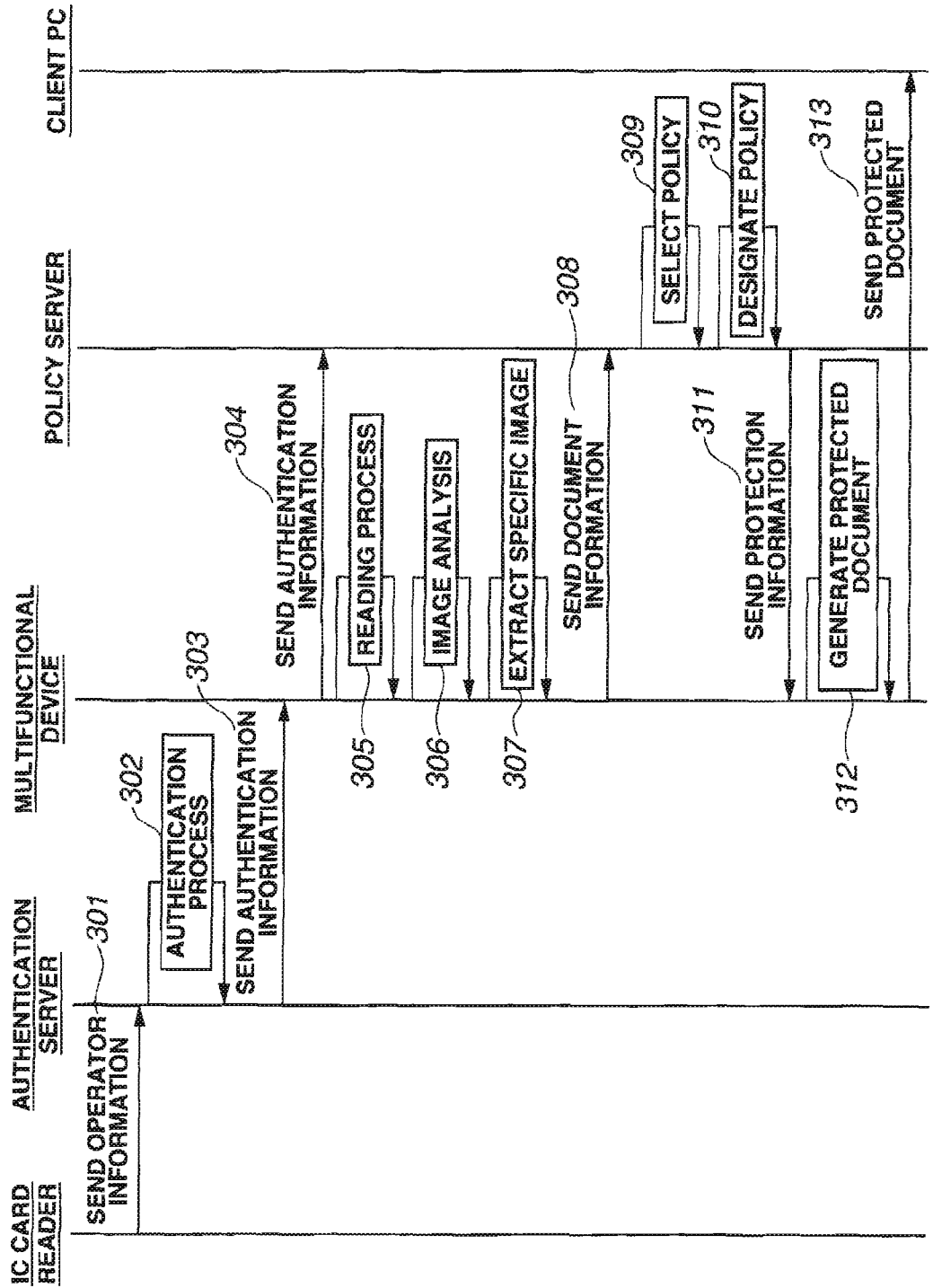
FIG. 3 is an example sequence diagram showing a state transition of the document process system of the exemplary embodiment of the present invention.

FIG. 3 is an example of a sequence diagram showing a state transition of the document process system of the exemplary embodiment of the present invention.

The sequence diagram shown in FIG. 3 shows a transition of process in the configuration shown in FIG. 1. The process starts with reading operator information from operator's IC card through the IC card reader, and the read operator information is sent to the authentication server as a request for authentication (301).

Upon receiving the request for authentication, the authentication server performs authentication by determining whether or not the operator is allowed to cause the multifunctional device to generate a protected document on the basis of the operator information (302). As a result of the authentication, if the operator is authenticated, the authenticated operator information is sent to the multifunctional device as the authentication information (303).

Upon receiving the authentication information, the multifunctional device sends the authentication information to the policy server (304), and performs reading process of the printed matter (3305). Then, the multifunctional device analyzes image information of a document obtained from the printed matter through the reading process (306), and extracts a specific image or character as extract information (extract image information, extract character information) (307).

Then, the multifunctional device sends information on the document including the obtained extract information to the policy server (308). Upon receiving the authentication information and the document information, the policy server selects the best suitable policy level based on the extract information included in the received document information (309), and designates policy information corresponding to the selected policy level as policy information set to the document (310).

Once the policy level of the document is designated in the policy server, the policy information corresponding to the policy level is sent to the multifunctional device, which is a requester (311). The sent policy information is information (protection information) used to create a protected document corresponding to the read document. Upon receiving the protection information, the multifunctional device generates the protected document using the protection information (312).

Then, the generated protected document is sent to the client PC (313), and operation using the client PC is made possible.

Figure 4:
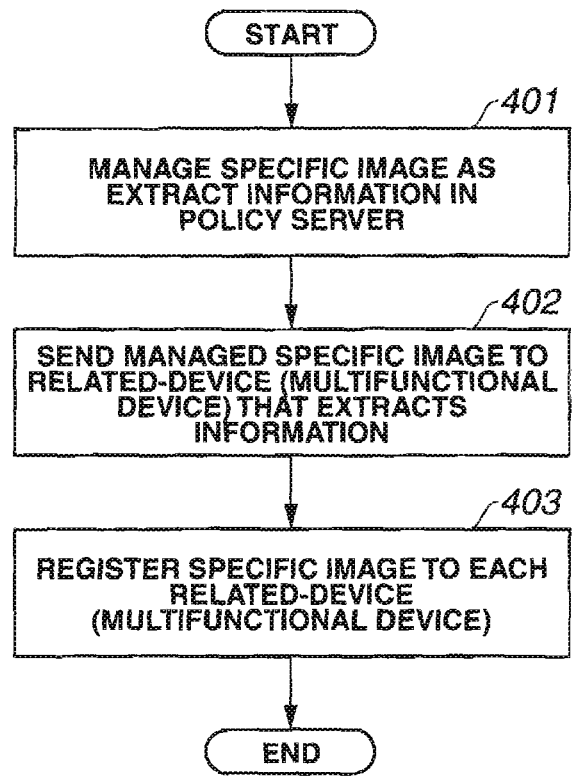
FIG. 4 is a flowchart showing a process flow of registering extract information managed by a policy server to a multi-functional device.
Figure 5:
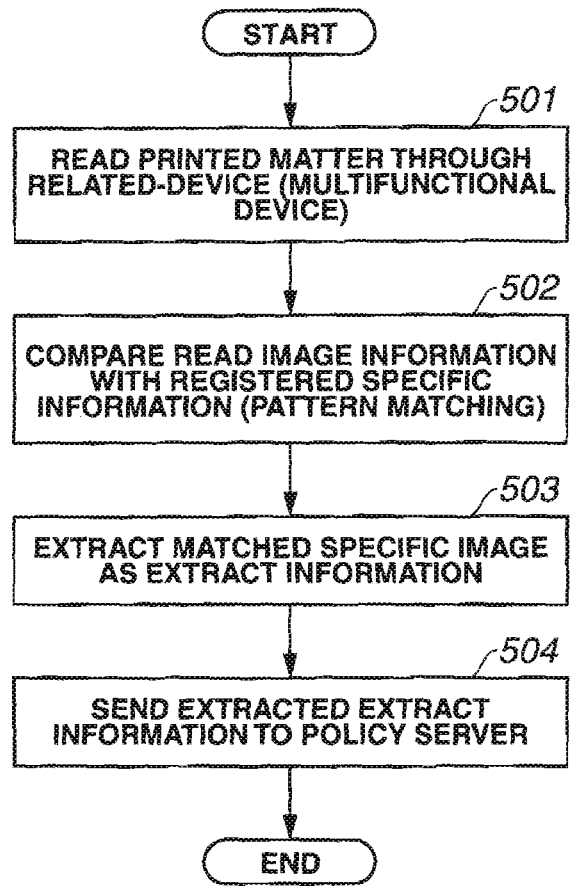
FIG. 5 is a flowchart showing a process flow of extracting the extract information.
Figure 6:
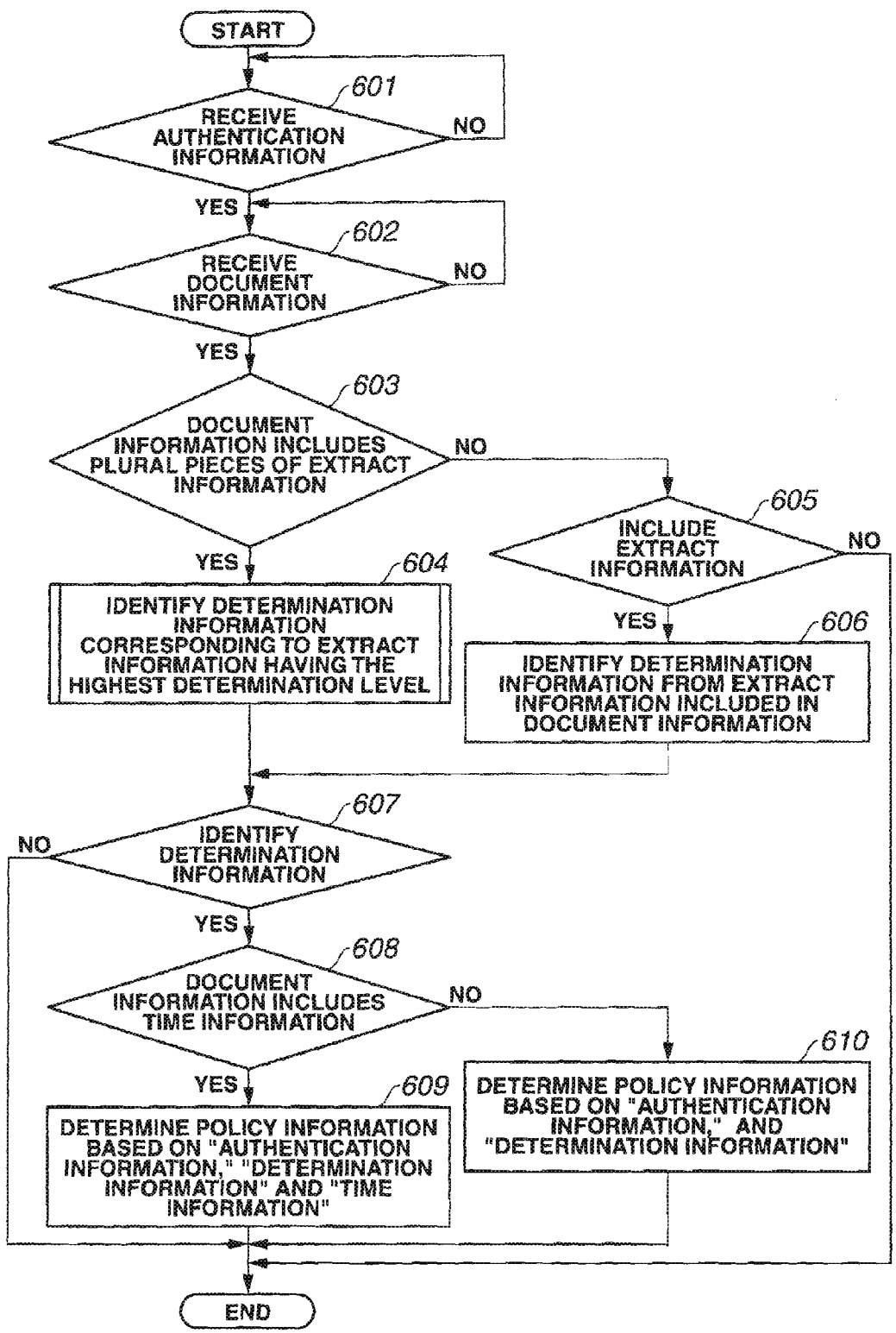
FIG. 6 is a flowchart showing a process flow of determining policy information set for a document.

FIGS. 4 through 6 are flowcharts showing process flows in the document process system of the present invention.

FIG. 4 is a flowchart showing a process flow in which extract information managed in the policy server is registered to the multifunctional device.

In FIG. 4, a specific image is managed as the extract information in the policy server (401), and the image managed by the extract information is sent to the multifunctional device (402) and is registered in the multifunctional device (403).

FIG. 5 is a flowchart showing a flow of a process of extracting the extract information.

In FIG. 5, once authentication of the operator is performed through the IC card reader, the multifunctional device starts the process and reads the printed matter (paper document) (501). Then, image information of a document obtained by reading the printed matter and the extract information registered in the multifunctional device through the flow as shown in FIG. 4 are compared using such method as pattern matching (502).

As a result of the comparison, if there is matched image information with the extract information registered in the multifunctional device, the matched image information is extracted (503).

Accordingly, by sending the extracted extract information to the policy server (504), the policy server can select the policy information corresponding to the extract information.

FIG. 6 is a flowchart showing a flow of a process of determining policy information set to the document.

In FIG. 6, once the operator indicated in operator information read through the IC card reader and so on is authenticated, the policy server starts the process.

The policy server, at first, determines whether or not authentication information of the operator authenticated by the authentication server is received from the multifunctional device (601). If the authentication information is already received (YES in 601) and the policy server receives document information from the multifunctional device (YES in 602), a process of determining the policy information is performed.

It is determined whether or not the document information received from the policy server includes plural pieces of extract information (603). If plural pieces of extract information are included (YES in 603), determination information corresponding to extract information having the highest determination level among the plural pieces of extract information is specified (604).

Figure 16:
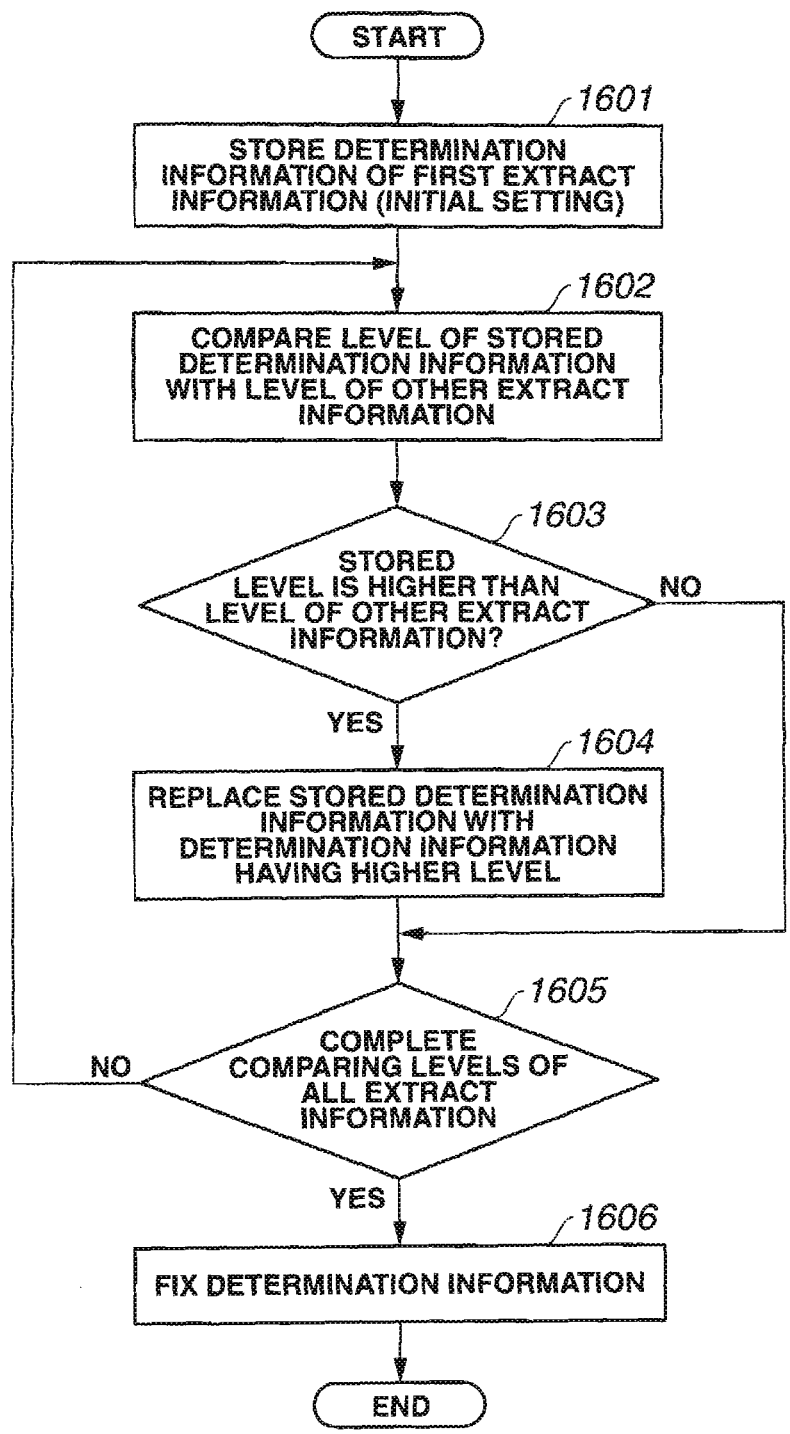
FIG. 16 is a flowchart showing a process flow in detail in a case where plural pieces of extract information are included in document information in the determination flow of the policy information shown in FIG. 6.

A flow of the process of specifying the determination information corresponding to the extract information having the highest determination level in the case of plural pieces of extract information is shown in flowchart of FIG. 16. It should be noted that the determination level is information for determining a confidential level of the extract information as shown in FIGS. 7A and 71B (see description of FIGS. 7A and 7B as described above).

On the other hand, in the case where the plural pieces of extract information are not included (NO in 603), the document information includes, for example, only single piece of extract information, or no extract information. Then, it is determined whether or not the document information includes one piece of extract information (605). If one piece of extract information is included (YES in 605), determination information corresponding to the extract information is specified (606). If no extract information is included in the document information (NO in 605), it is determined that policy information is not necessary.

Next, in the case where the document information includes the extract information, it is determined whether the determination information corresponding to the extract information is specified (607). If the determination information is not specified (NO in 607), it is considered, for example, that the determination information corresponding to the extract information is not registered. In this case, the process ends after an error process, such as displaying to that effect.

If the determination information is specified (YES in 607), then it is determined whether the received document information includes time information (608). The time information is information on a break for changing available operation to a document indicated in the document information.

If the time information is included (YES in 608), policy information is determined based on the received authentication information, the specified determination information and the time information (609).

Additionally, if the time information is not included (NO in 608), the policy information is determined based on the authentication information and the determination information (610).

As one example of the process above, for example, processes implemented in each case where a date of process is on or before "2008/03/31", and where a date of process is after "2008/03/31" will be described with reference to FIGS. 7A, 7B, 8 and 9, assuming a case where the received authentication information is "Development Department" and "Manager"; the extract information included in the received document information is character information "top secret"; and the time information included in the document information is "2008/03/31".

Since the extract information is character information "top secret", the determination level is "3" and the determination information is "Confidential" with reference to FIG. 7A. Incidentally, if the extract information is image information, the determination is made with reference to FIG. 7B. By referring to FIG. 8 using the determination information "Confidential" determined based on FIGS. 7A and 7B together with the received authentication information "Development Department" and "Manager", "G3" and "G2" are obtained as the corresponding policy level. Here, the policy information applied to the case where the date of process is on or before "2008/03/31" is determined to be "G3." Since the policy information of the "G3" corresponds to "—(No Prohibited Processing)" in FIG. 9, all the processes are allowed.

Additionally, the policy information applied to the case where the date of process is after "2008/03/31" is determined to be "G2." Since the policy information of the "G2" corresponds to "Copying, scanning, FAX, editing" in FIG. 9, all of these processes are prohibited.

As described above, the applied policy information may be changed in accordance with whether the date of process is on or before the time information, or after the time information.

It should be noted that, in the above example, policy information with more severe operation restriction may be applied when the date of process is after the time information. However, policy information with more moderate operation restriction may also be applied in accordance with a type of a target document. If this case is applied to the example above, the policy level is set so as to apply "G2" in the case where the date of process is on or before "2008/03/31" and to apply "G3" in the case where the date of process is after "2008/03/31".

FIG. 16 is a flowchart showing a flow of a process in detail in a case where plural pieces of extract information are included in the document information in the flow for determining the policy information shown in FIG. 6.

In FIG. 16, once it is determined that the document information includes plural pieces of extract information the process starts and determination information corresponding to any one of the plural pieces of extract information is temporarily stored (1601). Then, a determination level of the stored determination information is compared with a determination level of other extract information (1602).

Through the comparison above, it is determined whether or not the determination level of the other extract information is higher than that of the stored determination information (1603). If it is determined that the determination level of the other extract information is higher (YES in 1603), the stored determination level is replaced with the determination level of the other extract information (1604).

Additionally if it is not determined that the determination level of the other extract information is higher (NO in 1603), the determination level of the determination information stored in advance remains stored.

Then, it is determined whether or not all the determination information for the plural pieces of extract information included in the document information are compared (1605). If the determination level of all the extract information is compared (YES in 1605), the stored determination information having the highest determination level is determined to be information for judging a document state indicated by the document information (1606).

Additionally, if not all the determination levels are compared (NO in 1605), comparison of the determination level is performed again.

FIG. 17 is a diagram showing one state of policy information set to each document in the document process system of the exemplary embodiment of the present invention.

FIG. 17 is one example showing such information as policy information set to each of the document using a table configuration. The table configuration includes item "Document ID," item 1702' "Document name," item 1703 "Policy," item 1704 "Range of disclosure," item 1705 "Period of disclosure" and item 1706 "Storage location."

Information shown in FIG. 17 is managed by any of the policy server, the multifunctional device, the client PC and the document management device (not shown), and is information that is referred to when the document is operated.

The item 1701 "Document ID," the item 1702 "Document name," the item 1704 "Range of disclosure" and the item 1705 "Period of disclosure" are information included in the document information received from the multifunctional device and so on. The item 1701 "Document ID" is identification information for identifying the document to which policy information is set; the item 1702 "Document name" is information indicating a name of the document; the item 1704 "Range of disclosure" is information indicating a range where disclosure of the document is permitted; and the item 1705 "Period of disclosure" is information indicating the end of a period of disclosure.

Additionally, the item 1703 "Policy" indicates the policy information set to the document to be identified with the item 1701 "Document ID." The item 1706 "Storage location" is information indicating a place (location) where the document to which the policy information is set is stored.

For example, in a record having the item 1701 "Document ID" of "0234567," "customer information" is indicated in the item 1702 "Document name"; "G1" is indicated in the item 1703 "Policy"; "Xth sales department"; is indicated in the item 1704 "Range of disclosure"; "2008/03/31" is indicated in the item 1705 "Period of disclosure"; and "https://abc.co.jp/129" is indicated in the item 1706 "Storage location."

The above example indicates that policy information "G1" is set to the document named "customer information" and identified by "00234567"; the range where disclosure is permitted is "Xth sales department"; period of disclosure ends on "2008/03/31"; and the document is stored in "https://abc.co.jp/129."

Second Example

The First Example described above provides a configuration in which extract information is extracted by the multifunctional device; and policy information determined by the policy server is set to a document obtained by reading a printed matter by the multifunctional device. However, the configuration is not limited to this. As shown in the Second Example, it may be possible to employ a configuration in which other process server is provided to realize. Additionally, although operator information is read through the IC card reader, a client PC may be used to perform authentication process of the operator.

Figure 11:
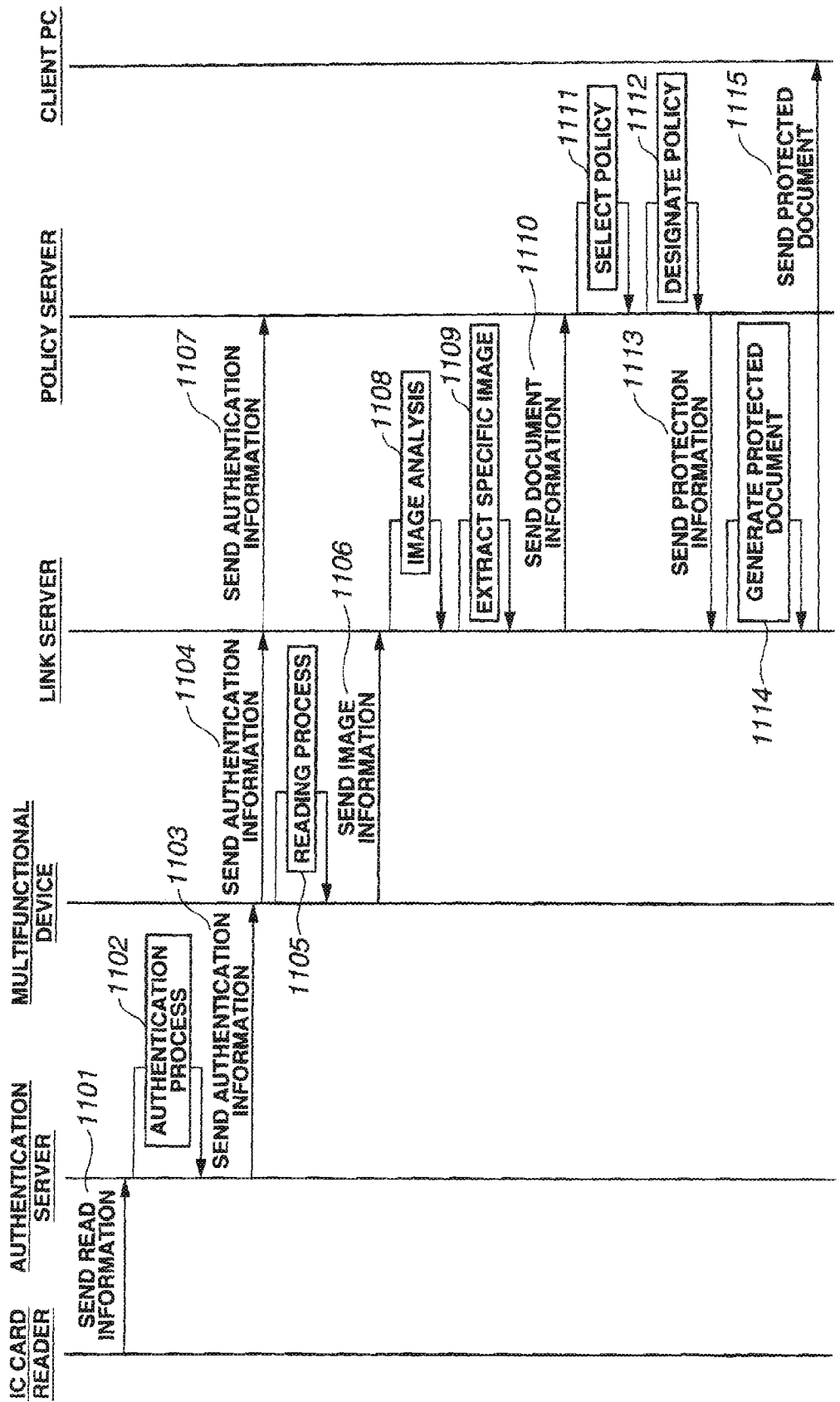
FIG. 11 is a sequence diagram showing a state transition in the document process system having a system configuration shown in FIG. 10.
Figure 12:
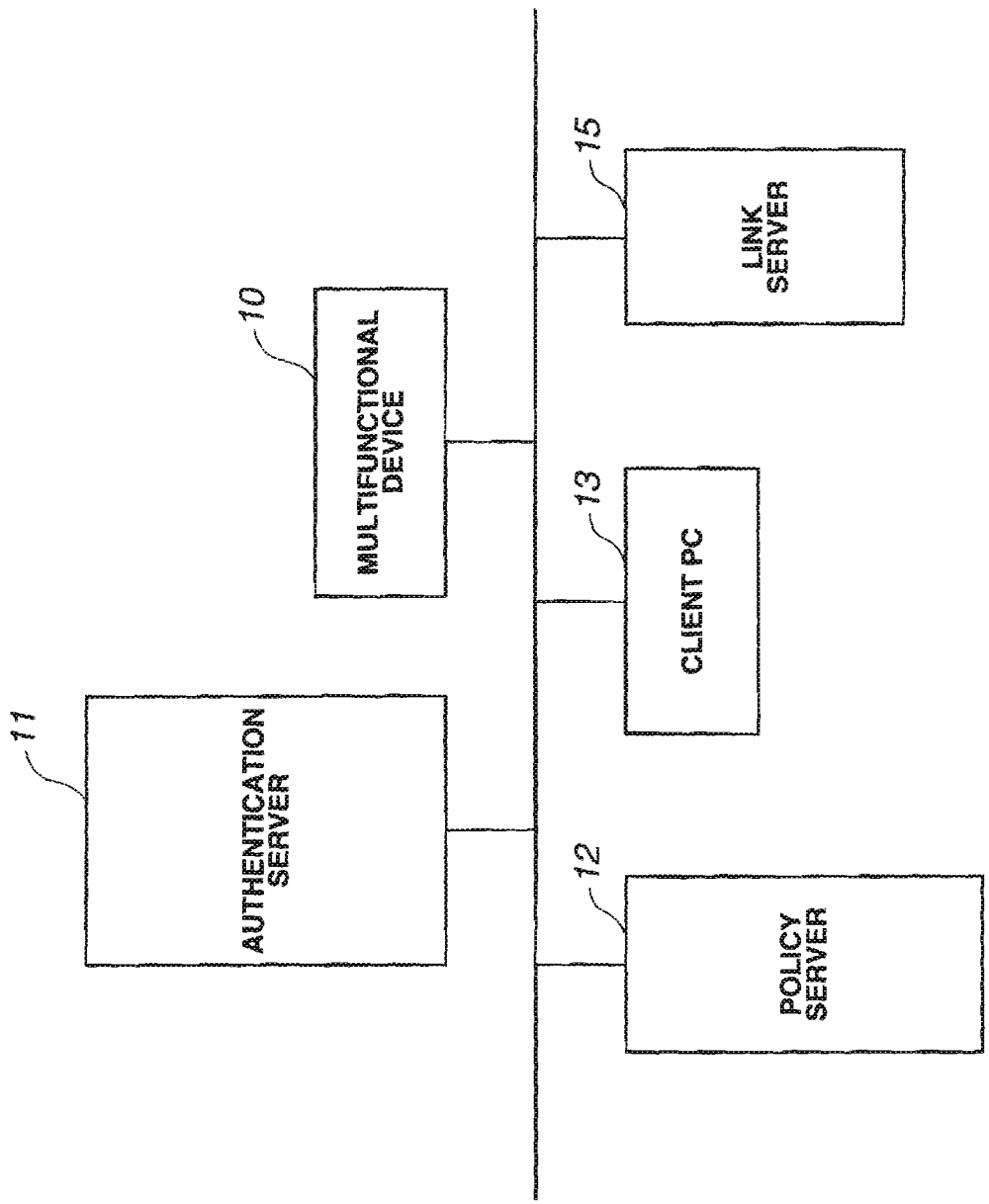
FIG. 12 is a system configuration diagram in which authentication of an operator is performed between a client PC 13 and an authentication server 11, which is similar to FIG. 10 but is without an IC card reader in the configuration shown in FIG. 10.
Figure 13:
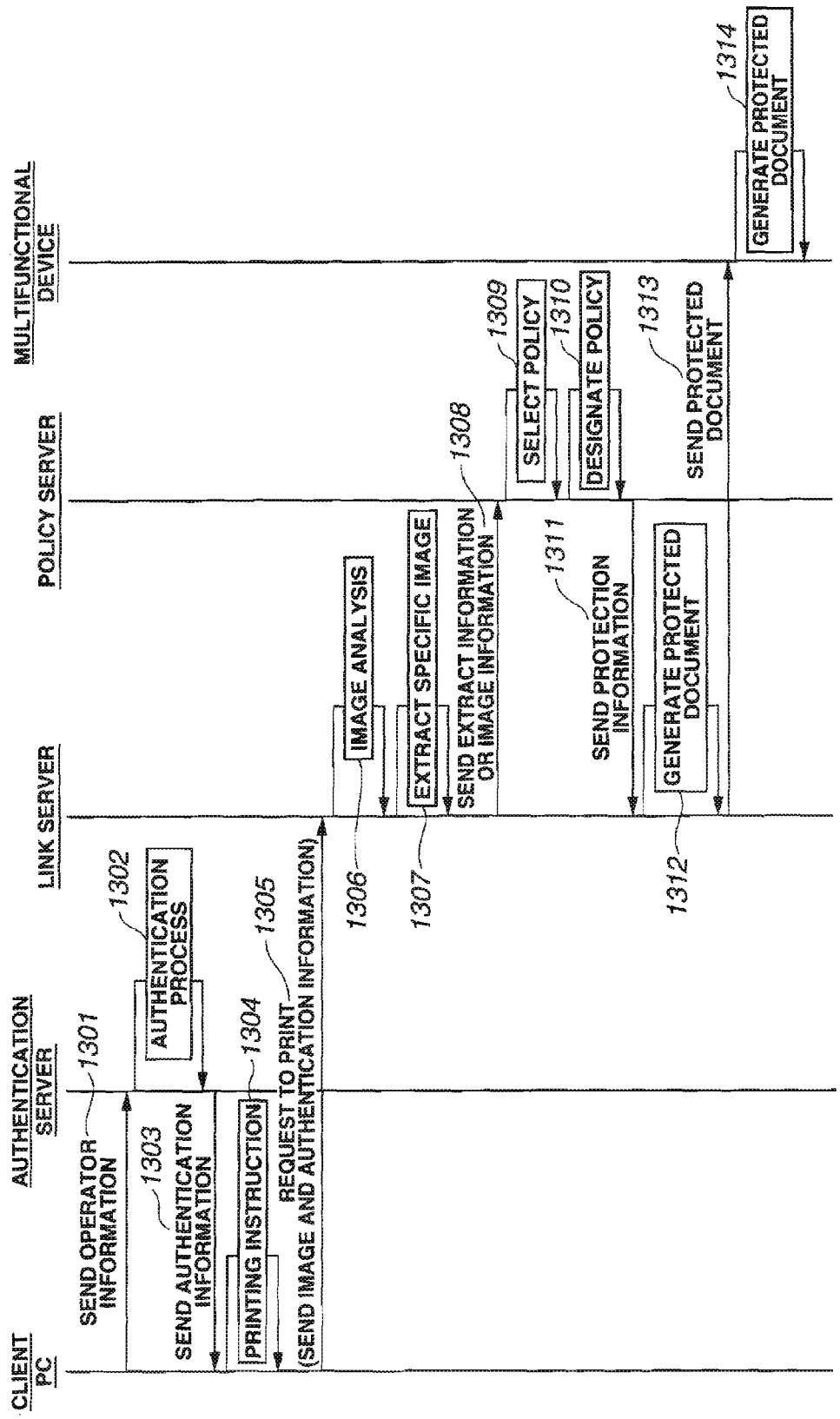
FIG. 13 is a sequence diagram showing a process transition in the document process system having the configuration shown in FIG. 12.

Process transition in the Second Example will be described using sequences shown in FIGS. 11 and 13. It should be noted that a system configuration diagram for FIG. 11 is shown in FIG. 10, and a system configuration diagram for FIG. 13 is shown in FIG. 12.

Figure 10:
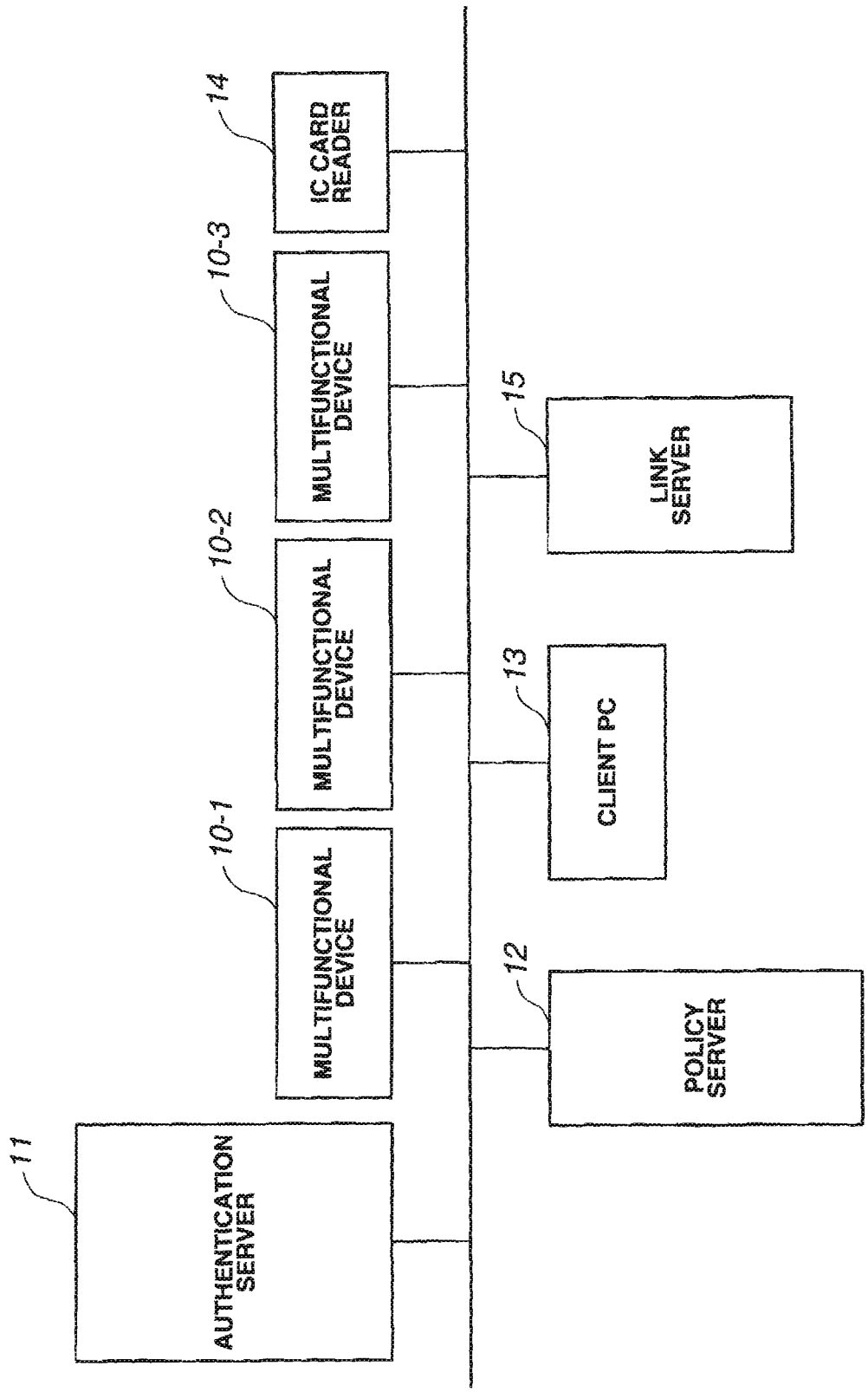
FIG. 10 is a diagram showing a configuration in which a link server 15 for generating a protected document is added to the configuration shown in FIG. 1.

Since a configuration diagram shown in FIG. 10 is similar to that shown in FIG. 1, description will be focused primarily on differences between those diagrams.

FIG. 10 is a diagram showing a configuration in which a link server 15 for generating a protected document is added to the configuration diagram shown in FIG. 1.

The link server 15 implements processes other than a process of reading printed matters in place of the multifunctional device shown in the First Example, and serves as a linkage between the multifunctional device and the policy server. In a configuration in which plural multifunctional devices are provided to a network, the link server 15 may set policy information to a document in place of each of the multifunctional devices.

FIG. 11 is a sequence diagram showing a state transition in a document process system having a system configuration shown in FIG. 11.

In FIG. 11, the IC card reader reads operator information from the IC card (1101); the authentication server (1102) performs authentication; and authentication information is sent to the multifunctional device (1103). The multifunctional device sends the received authentication information to the link server (1104), and reads the printed matter (1105). The multifunctional device sends image information of a document obtained by reading the printed matter to the link server (1106). Meanwhile, the link server sends the authentication information received from the multifunctional device to the policy server (1107).

Upon receiving the image information, the link server analyzes the image information (1108), and extracts extract information (1109). In the link server, extract information managed by the policy server is registered in advance. The link server extracts the extract information from the image information by performing pattern matching with the registered extract information.

Then, upon extracting the extract information, the link server sends the extracted extract information to the policy server (1110).

Receiving the authentication information and the extract information from the link server, the policy server selects the best suitable policy information using these pieces of information (1111). The policy server designates the selected policy information as policy information to be set (1112), and sends the policy information to the link server as the protection information (1113). In other words, the policy information is information based on which the protected document is generated.

The link server generates the protected document using the policy information corresponding to the received protection information (1114), and sends the generated protected document to the client PC (1115), which enables operations based on the policy information.

FIG. 12 is a diagram similar to FIG. 10, and shows a system configuration in which authentication of the operator is performed between the client PC 13 and the authentication server 11 without the IC card reader in the configuration shown in FIG. 103.

Firstly, using the client PC 13, authentication of the operator who requests to print is performed through communication with the authentication server 11. Once the authentication is completed, the request to print is made to the link server 15. The request to print includes image information to be printed out as well as authenticated operator information. Then, the link server 15, which receives those pieces of information, performs processes for the multifunctional device 10 as described in the First Example, and sends the generated protected document to the multifunctional device.

FIG. 13 is a sequence diagram showing a process transition in the document process system having the configuration shown in FIG. 12.

FIG. 13 shows a flow of a process of printing out a document through the multifunctional device. At the time of printing out in this process, the policy information is set to the document.

The client PC sends to the authentication server operator information of an operator who performs printing out (1301). After authenticating the operator shown in the operator information (1302), the authentication server sends the authenticated authentication information to the client PC (1303).

Upon receiving the authentication information, the client PC gives printing instruction (1304), and sends image information and the authentication information to the link server as a printing request (1305). Upon receiving the printing request, the link server analyzes the image information included in the printing request (1306), and extracts a specific image from the image information as extract information (1307).

If the extract information can be extracted, the extract information is sent to the policy server; and if the extract information cannot be obtained, the image information received from the client PC and included in the printing request is sent to the policy server (1308). The policy server selects the best suitable policy information based on these pieces of information above (1309), and designates the selected policy information as policy information to be set (1310).

The policy server sends the designated policy information to the link server (1311). Upon receiving the policy information, the link server generates a protected document based on the policy information (1312). By sending the generated protected document to the multifunctional device (1313), the multifunctional device prints out the protected document (1314).

At the time of the printing out above, for example, it may be possible to employ a configuration in which a specific code is incorporated to the document using the digital watermarking technique. The code to be incorporated is generated based on information indicating content of operation restriction and information indicating a creator or operator of the document.

Figure 14:
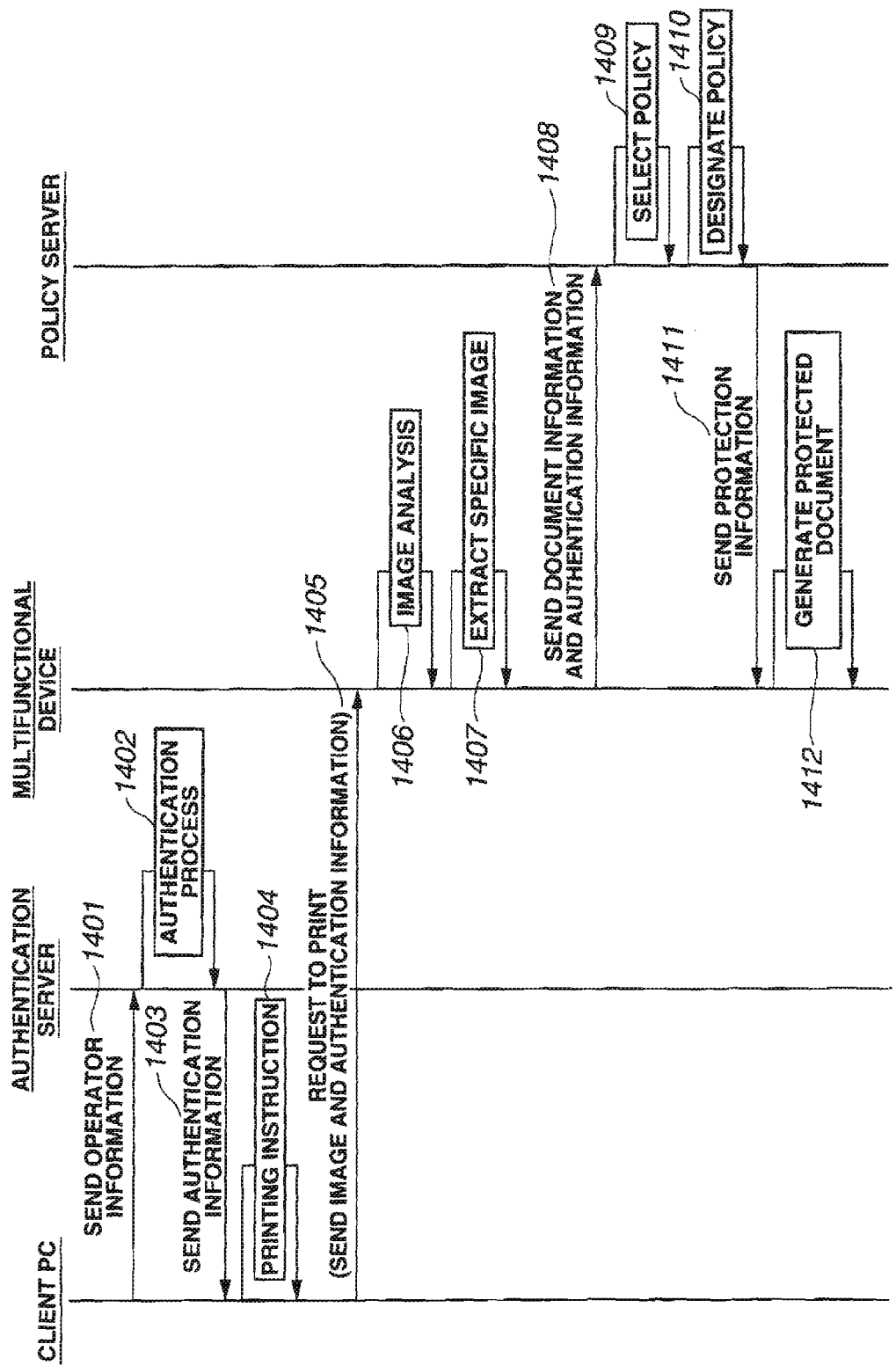
FIG. 14 is a sequence diagram showing a process in a case where the link server 15 is removed from the document process system having a system configuration shown in FIG. 12.

FIG. 14 is a sequence diagram showing a process in a case where the link server 15 is disconnected in the document process system having a system configuration shown in FIG. 12.

FIG. 13 shows a process transition in the configuration shown in FIG. 12. FIG. 14 shows a process in a case where processes implemented by the link server 15 in FIG. 12 are implemented by the multifunctional device.

In FIG. 14, the client PC sends to the authentication server operator information of an operator who performs printing out (1401). After authenticating the operator indicated in the operator information (1402), the authentication server sends the authenticated authentication information to the client PC (1403).

Upon receiving the authentication information, the client PC gives a printing instruction (1404), and sends image information and the authentication information to the multifunctional device as a printing request (1405). Upon receiving the printing request, the multifunctional device analyzes the image information included in the printing request (1406), and extracts a specific image from the image information as extract information (1407).

Then, the multifunctional device sends document information including the extracted extract information and the authentication information included in the printing request to the policy server (1408). The policy server selects the best suitable policy information based on these pieces of information (1409), and designates the selected policy server as policy information to be set (1410).

Upon designating the policy information, the policy server sends the designated policy information to the multifunctional device as protection information (1411). The multifunctional device generates protected document based on the policy information received as the protection information (1412).

Third Example

In the Third Example, a process of applying policy to a document obtained by reading a printed matter regardless of authentication will be described. A configuration in the Third Example is similar to that shown in FIG. 12. A process as shown in FIG. 15 is implemented through the configuration shown in FIG. 12.

Figure 15:
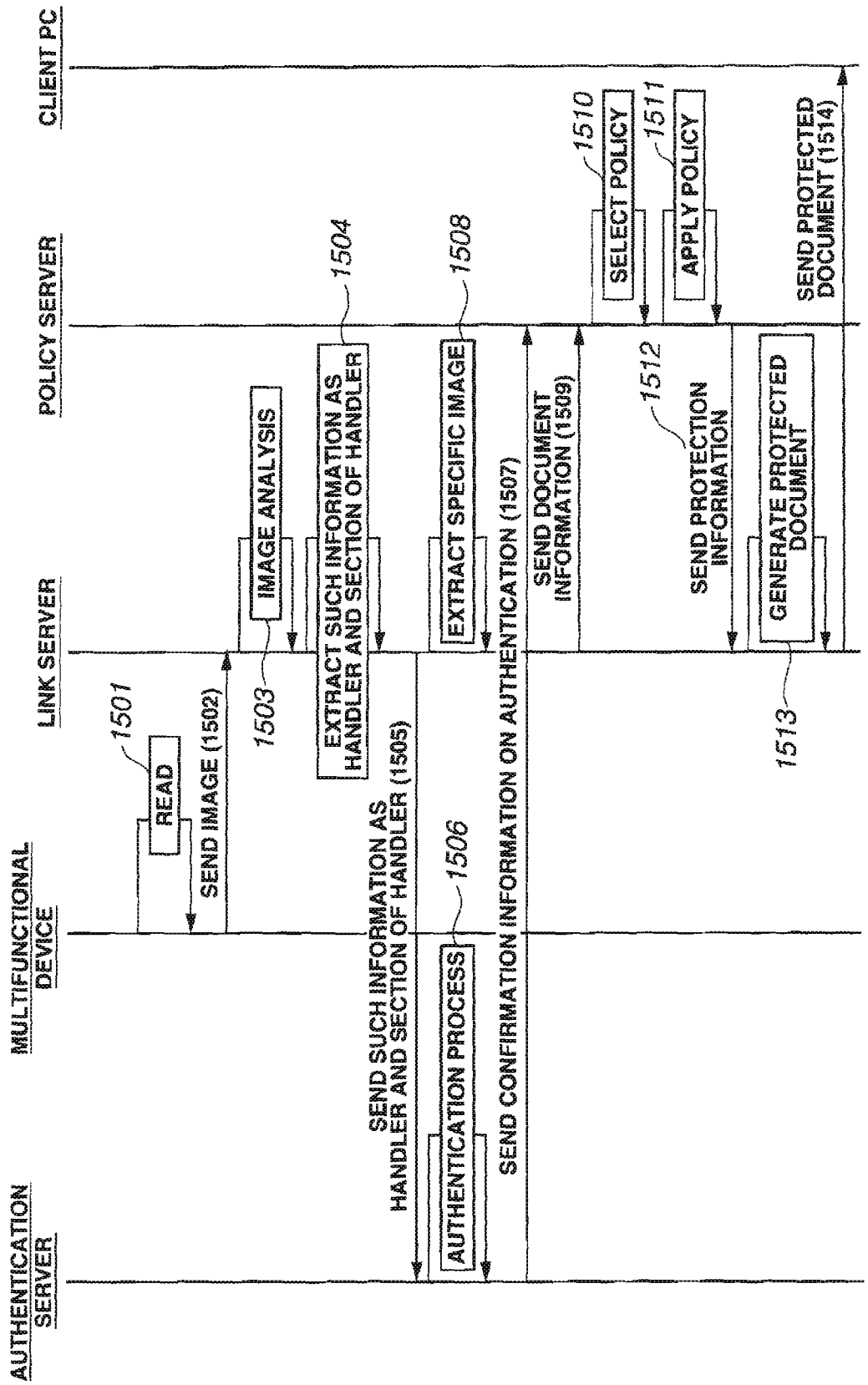
FIG. 15 is an example of a sequence diagram showing a state transition of the document process system of the exemplary embodiment of the present invention.

FIG. 15 is an example of a sequence diagram showing a state transition of the document process system of the exemplary embodiment of the present invention.

In FIG. 15, by placing a printed matter to the multifunctional device and depressing a start button and so on to give an instruction of a request to read the printed matter, the process starts. In response to the request for reading, the multifunctional device reads the printed matter (1501), and sends to the link server image information of the printed matter formed through reading (1502).

Upon receiving the image information, the link server analyzes the image information (1503), and extracts information on a handler included in the image information and information on handler's section indicating a section to which the handler belongs (1504). Hereinafter, these pieces of information are collectively referred to as "handler information."

Next, to authenticate the handler indicated in the extracted handler information, the link server sends the handler information to the authentication server (1505) as an authentication request. Upon receiving the authentication request including the handler information, the authentication server performs the authentication process of the handler (1506). If the authentication is completed, the authentication server shows that the handler is authenticated before the policy server designates policy by sending to the policy server confirmation information indicating that the authentication is completed (1507).

While the authentication as described above is being performed, the link server extracts a specific image from the information image (1508). By sending document information of the printed matter including the extracted specific image to the policy server, the policy can be designated (1509).

Upon receiving the confirmation information indicating that the authentication server completes the authentication and receiving the document information from the link server, the policy server selects the best suitable policy to be applied based on these pieces of information (1510). Then, a policy based on the selected policy is applied (1511).

The policy server sends to the link server protection information used for generating a protected document based on the applied policy (1512). The link server generates the protected document using the received protection information (1513).

Then, the link server sends the generated protected document to the client PC (1514), enabling such processes as viewing, referring to and updating.

One example of the process of generating the protected document above will be described in detail below.

For example, the designated policy applied to the document is encrypted policy; the document is encrypted using an encryption key; and the encrypted document is decrypted using a decryption key corresponding to the encryption key.

In this case, the protection information sent from the policy server to the link server is the encryption key, and the protected document generated by the link server is generated as encrypted document to which the encryption key is applied.

Incidentally, when the encrypted document is referred to or updated using the client PC, the encrypted document is decrypted through either of receiving the decryption key from the policy server or sending the encrypted document to the policy server.

It should be noted that, for the present invention, it may be possible to configure a document process system that implements the processes as described above by providing a recording medium (CD-ROM, DVD-ROM and so on) storing a program for implementing the operations as described above or for forming the means as described above in a document process system having a communication function; installing the program from the recording medium to a computer; and executing the computer to implement the program. In the computer forming the document process system, a CPU (Central Processor Unit), a ROM (Read Only Memory), a RAM (Random Access Memory) and a hard disc are connected through a system bus. The CPU implements processes in accordance with a program stored in the ROM or the hard disc using the RAM as a working space.

Additionally, the medium for providing a program may be a communication medium (medium that temporarily or dynamically retaining a program, such as communication lines and communication system). For example by posting the program to the UBS (Bulletin Board Service) on a communication network, the program may be distributed through the communication network.

The present invention is not limited to the exemplary embodiments as described above and illustrated in the drawings, and may be appropriately modified for embodiment without departing from the spirit and scope thereof.

The foregoing description of the exemplary embodiments of the present invention is provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the alt to understand the invention for various embodiments and with the various modifications as are suited to the particular use contemplated. It is intended that the scope of the invention be defined by the following claims and their equivalents.

What is claimed is:

1. A document process system, comprising:
an authentication server that authenticates an operator of an operation target document;
a processor; and
a memory containing instructions adapted to cause the processor to act as:
an image reading section that reads image information from a paper document;
an extraction section that extracts specific information that is a setting basis for setting an operation restriction information to the operation target document based on at least one of a specific character string and a specific image that are included in the image information read from the paper document by the image reading section;
a setting section that sets the operation restriction information of the document based on authentication information of the operator authenticated by the authentication server and the specific information extracted by the extraction section; and
a generation section that generates a protected document to which the operation restriction information is set by the setting section based on the operation target document,
wherein a plurality of the specific information are extracted by the extraction section, and the setting section then determines a determination level for each of the specific information and specifies the determination level having a highest determination level among the plurality of the determination levels for each of the plurality of the specific information, and specifies determination information corresponding to the specified highest determination level, and sets the operation restriction information of the document based on the specified determination information;
wherein the determination information represents information for determining a security state of the document from which the specific information is extracted, and wherein the setting section determines whether the image information read from the paper document includes time information.

2. The document process system according to claim 1, wherein
the operation restriction information is modified if the time of operation is after the time information.

3. The document process system according to claim 1, wherein the specific information is extracted by the extraction section from a single paper document.

4. An image formation device, comprising:
an authentication server that authenticates an operator of an operation target document;
a processor; and
a memory containing instructions adapted to cause the processor to act as:
an image reading section that reads image information from a paper document;
an extraction section that extracts specific information that is a setting basis for setting an operation restriction information to the operation target document based on at least one of a specific character string and a specific image that are included in the image information read from the paper document by the image reading section;
a setting section that sets the operation restriction information of the operator based on an authentication information of the operator who is authenticated by the authentication server and the specific information extracted by the extraction section; and
a generation section that generates a protected document to which the operation restriction information is set by the setting section based on the operation target document,
wherein a plurality of the specific information are extracted by the extraction section, and the setting section then determines a determination level for each of the specific information, specifies determination information corresponding to the specific information with a highest determination level, and sets the operation restriction information of the document based on the specified determination information, and
wherein the setting section determines whether the image information read from the paper document includes time information.

* * * * *